United States Patent Office 3,089,866
Patented May 14, 1963

3,089,866
PROCESS FOR THE PREPARATION OF FLUORINE-CONTAINING POLYMERS
George H. Crawford, Jr., Rahway, N.J., assignor, by mesne assignments, to Minnesota Mining and Manufacturing Company, St. Paul, Minn., a corporation of Delaware
No Drawing. Filed May 25, 1956, Ser. No. 587,212
1 Claim. (Cl. 260—92.1)

The present invention relates to a novel and improved process for the production of fluorine-containing polymers. In one aspect, this invention relates to an improved process for the polymerization of fluorine-containing mono-olefins. In another aspect this invention relates to an improved process for the polymerization of fluorine-containing diolefins.

Fluorine-containing polymers ranging from low molecular weight materials such as oils and greases to higher molecular weight normally solid materials such as waxes, thermoplastics and elastomers are of outstanding industrial importance. Among the most useful polymers in this field are polymers of trifluorochloroethylene which polymers possess excellent chemical resistance and thermal stability. Polymers derived from fluorine-containing diolefins such as 2-fluorobutadiene and hexafluorobutadiene also are valuable materials. The industrial application of such fluorine-containing polymers may be limited, however, due to the difficulty in the polymerization of fluorine-containing olefins to yield a polymer of a certain desired molecular weight. In certain instances highly specialized techniques such as the use of very high pressure and special types of polymerization systems such as those employing a chain transfer agent are required to effect such polymerization reactions so that the molecular weight is controlled to yield a polymer of desired molecular weight.

It is an object of this invention to provide an improved process for the preparation of useful and valuable fluorine-containing polymers ranging from low molecular weight oils and greases to higher molecular weight, normally solid materials such as waxes, thermoplastics and elastomers.

Another object is to provide an improved process for the homopolymerization and interpolymerization of fluorine-containing olefins which process leads to good conversions of said olefins to polymer product and which is readily controlled to yield a polymer of desired molecular weight.

Another object is to provide an improved process for the polymerization of fluorine-containing monoolefins and especially the perfluoro- and perfluorochloro-monoolefins.

A further object is to provide an improved process for the polymerization of fluoro-1,3-dienes.

Other objects and advantages of the present invention will become apparent to those skilled in the art from the accompanying description and disclosure.

Accordingly, these objects are accomplished by the process which comprises polymerizing a fluorine-containing olefin in the presence of a polymerization activator comprising a Ziegler type catalyst to produce a fluorine-containing polymer as a product of the process. The preferred Ziegler catalysts to be employed are those containing a trivalent metal, i.e. aluminum, indium, or gallium, in which said metal is bonded to at least one organic radical. Such catalysts may be used as the essential polymerization activator, or they may be used in conjunction with compounds of metals of groups IV, V, VI, and VIII of the periodic system, the latter compounds being referred to herein as the polymerization co-catalyst.

Generally, the process of this invention is carried out at a temperature from about −80° C. to about 100° C., and is usually carried out at a temperature below 60° C.

This polymerization process is readily controlled to yield fluorine-containing polymers ranging from low molecular weight oils and greases to normally solid materials such as waxes, thermoplastics and elastomers in good yield.

As indicated above, the polymerization activators of this invention comprise Ziegler type catalysts which are the zinc dialkyls; magnesium dialkyls; and inorganic hydrides and organic compounds of beryllium, aluminum, indium, and gallium. The organic compounds of beryllium include beryllium dialkyls, beryllium diaryls and alkyl and aryl beryllium hydrides. The preferred Ziegler type catalysts to be employed to polymerize a fluorine-containing olefin as described herein are the organic-metallo compounds of a trivalent metal, i.e. compounds of aluminum, indium, and gallium in which the metal is bonded to at least one organic radical such as an alkyl or aryl group. Of the organic-metallo compounds to be used, the aluminum compounds are preferred in the process of this invention and are compounds in which aluminum is bonded only to the carbon of an alkyl or aryl radical such as in the trialkyl and triaryl aluminum compounds; compounds in which aluminum is bonded to an alkyl or aryl radical and halogen such as in the dialkyl and diaryl aluminum halides; compounds in which aluminum is bonded to an alkyl or aryl radical and hydrogen such as in the alkyl and aryl aluminum dihydrides, and the dialkyl and diaryl aluminum hydrides; compounds in which aluminum is bonded to an alkyl or aryl radical and halogen and hydrogen such as in the aluminum hydrogen halides; and compounds in which aluminum is bonded to an alkyl or aryl radical and is additionally bonded to an alkoxy, aryloxy, secondary amino, secondary acid amido, mercaptan, thiophenol, carboxylate or sulfonic acid radicals.

The organic radical which is common to each of the organic-metallo compounds is an alkyl or aryl group having from 1 to 20 carbon atoms per radical and preferably has not more than 6 carbon atoms per radical. The particularly preferred Ziegler catalysts employed as an activator in accordance with this invention are the trialkyl aluminum compounds, triaryl aluminum compounds, and the dialkyl and diaryl aluminum halides, i.e. fluorides, chlorides or bromides. It is to be understood that the aforementioned Ziegler type catalysts may be used singly or in admixture without departing from the scope of this invention.

Typical examples of suitable Ziegler type catalysts to be used are aluminum trihydride; beryllium hydride; dimethyl magnesium; diethyl zinc; dimethyl aluminum hydride; ethyl aluminum dihydride; n-hexyl aluminum dihydride; beryllium diethyl; zinc dimethyl; triethyl aluminum trimethyl aluminum; tripropyl aluminum; triisobutyl aluminum; aluminum tri-n-hexyl; trimethyl indium; triethyl indium; triphenyl aluminum; triphenyl gallium; diethyl aluminum fluoride; dimethyl aluminum bromide; diethyl aluminum bromide; diisobutyl aluminum chloride; diethyl aluminum phenolate; diethyl piperidyl aluminum; dimethylamino diethyl aluminum; ethylmercaptyl diethyl aluminum; diethyl zinc and methoxy dimethyl aluminum.

As indicated above, the polymerization acitvator may consist essentially of one of the above-mentioned Ziegler catalysts, or it may be used in conjunction with co-catalysts comprising various derivatives of a transition metal of groups IV, V, VI, and VIII of the periodic system. Thus, various derivatives of titanium, zirconium, hafnium, thorium, vanadium, columbium, tantalum, chromium, molybdenum, tungsten, iron, cobalt, nickel, and palladium may be used. The various derivatives of these metals which are suitably employed as co-catalyst are the inorganic derivatives such as the halides e.g. the chlorides and bromides; the oxy-halides e.g. the oxychlorides; halogen-complexes e.g. fluorine complexes; oxides; hydroxides; and organic derivatives such as acetates, benzoates, and acetyl acetates. Of the co-catalysts to be employed, the halide derivatives are preferred and are exemplified by titanium tetrachloride, zirconium tetrachloride, ferric chloride, ferrous chloride, nickel chloride, palladium dichloride, manganese dichloride, chromium dichloride, and tungsten hexachloride. Of these compounds the halides of titanium, zirconium, and iron such as titanium tetrachloride, zirconium tetrachloride, and ferric chloride are particularly preferred. Among the advantages realized by using such compounds as co-catalysts in conjunction with the above-described compounds of metals of groups II and III are: the rate of reaction is considerably faster; the polymerization may be carried out at a lower temperature; and the conversions of monomer(s) to polymer product are significantly increased. When a normally solid material is desired as a product of the process, the use of such co-catalysts is recommended.

The concentration of the Ziegler type catalyst with respect to the concentration of the co-catalyst may vary over a relatively wide range without departing from the scope of this invention. Thus, they may be used in a ratio of between about 0.05 to about 2.0 moles of co-catalyst per mol of Ziegler catalyst and preferably are used in a mole ratio of between about 0.1 and 0.5 per mol of Ziegler catalyst.

The fluorine-containing unsaturated compounds which are polymerized in accordance with this invention are those having at least one carbon to carbon ethylenic double bond and include the partially halogenated and perhalogenated fluorine-containing mono-unsaturated and poly-unsaturated compounds having not more than about 15 and preferably not more than 10 carbon atoms per molecule. Of the fluorine-containing monoolefins to be employed, those that are preferred are compounds having at least as many fluorine atoms as there are carbon atoms and in which any additional halogen substitution is chlorine. The preferred polyolefins to be employed are the fluoro-1,3-butadienes having fluorine as the only halogen substitution and include the methyl substituted butadienes and the trifluoromethyl substituted butadienes. In addition to halogen, the olefins to be employed may contain aryl, carboxylate, amido, nitrile and alkoxy substituents.

Typical examples of the monoolefins to be employed are the partially halogenated fluoroethylenes such as vinylidene fluoride, 1,1-chlorofluoroethylene and trifluoroethylene; partially halogenated fluoropropenes such as 3,3,3-trifluoropropene, 2-chloro-3,3,3-trifluoropropene, 1,1,3,3,3-pentafluoropropene, and 2,3,3,3-tetrafluoropropene; partially halogenated butenes such as 3,3,3-trifluoroisobutene, 1,1,1-trifluoro-3-trifluoromethylbutene-2, and hexafluoroisobutene; perfluorohalo-monoolefins such as trifluorochloroethylene, trifluorobromoethylene, tetrafluoroethylene, dichlorodifluoroethylene, hexafluoropropene, 2-chloropentafluoropropene, 4,4-dichloroperfluorocyclobutene, and perfluorocyclobutene.

Typical examples of the fluorine-containing diolefins to be employed are: 2-fluorobutadiene; 2-trifluoromethylbutadiene; 1,1-difluorobutadiene; 1,1,2-trifluorobutadiene; 1,1,3-trifluorobutadiene; 1,1-difluoro-3-trifluoromethylbutadiene; 1,1,3-trifluoro-2-methyl-butadiene and hexafluorobutadiene.

The aryl, carboxylate, amido, nitrile and alkoxy substituted halogen-containing olefins to be employed are phenyl-trifluoroethylene, alpha-trifluoromethyl-styrene, methyl-alpha-fluoroacrylate, methyl-alpha-trifluoromethylacrylate, alpha-trifluoromethylacrylonitrile and 1,1,2,2-tetrafluoroethyl vinyl ether.

It is to be understood that the polymerization activators of this invention may be used to copolymerize as well as to homopolymerize the above-mentioned monomers. Thus, for example, the following monomer mixtures may be advantageously copolymerized as described herein: trifluorochloroethylene and vinylidene fluoride; tetrafluoroethylene and vinylidene fluoride; hexafluoropropene and vinylidene fluoride; hexafluoropropene and tetrafluoroethylene; 1,1,2,2-tetrafluoroethyl vinyl ether and 1,1,2-trifluorobutadiene; 1,1,3-trifluorobutadiene and 1,1,2-trifluorobutadiene; and phenyl-trifluoroethylene and 1,1,3-trifluorobutadiene.

The concentration of polymerization activator such as dialkyl aluminum halide employed with respect to total monomer(s) used may vary over relatively wide limits without departing from the scope of this invention. Generally between about 10 and about 800 moles and preferably between about 50 and about 200 moles of monomers are used per mole of the Ziegler polymerization activator in accordance with this invention.

The polymerization process is carried out at temperatures between about −80° C. and about 100° C. and preferably at a temperature between about −40° C. and about 60° C. The particularly preferred temperature to be employed depends to a large extent upon the type of fluorine-containing olefin which is to be polymerized. When a fluoromonoolefin such as trifluorochloroethylene, for example, is employed, it is particularly preferred to operate at a temperature from about −20° C. to about 40° C. When a fluoro-diene such as 1,1,3-trifluorobutadiene and 1,1,2-trifluorobutadiene are employed, the rate of polymerization obtained in the presence of the activators of this invention is extremely rapid and it is particularly preferred to carry out such polymerizations at a temperature from about −40° C. to about 10° C.

The pressure to be employed also may vary over relatively wide limits such as from about substantially atmospheric pressure to about 1,000 atmospheres although the use of pressures above 200 atmospheres generally is unnecessary. The process of this invention is conveniently conducted under autogenous conditions of pressure in a suitable pressure vessel. It has been observed that when a fluoro-diene is employed, for example, 1,1,2-trifluorobutadiene or 1,1,3-trifluorobutadiene or any admixture thereof, the polymerization results in very high conversions of monomer to polymer product even at atmospheric pressure. The rate of reaction varies and depends in general upon the particular monomer or mixture of monomers used and the type of Ziegler catalyst employed. Generally the time of reaction varies from about one minute to about 72 hours. The longer reaction times, i.e. more than about one hour are usually used when polymerizing a fluoromonoolefin or when using an organo-metallic compound in which the metal is bonded only to an organic radical, said organic radical having four or more carbon atoms.

The presently described process of this invention may be carried out in the presence or absence of an inert liquid as a suspending medium for the catalyst. Thus, the polymerization reaction may be carried out in an aliphatic hydrocarbon such as pentane, hexane, cyclohexane; aromatic hydrocarbons such as xylene, toluene, and benzene; and ethers such as diethyl ether and dibutyl ether.

It is to be understood that the Ziegler type catalysts employed herein may be used in the form of complexes with alkali metal hydrides, alkyls or aryls; ethers, thioethers and amines without departing from the scope of this invention. Examples of such complexes are $LiAlH_4$, $LiAl(C_2H_5)_4$, $NaBe(C_2H_5)_3$, and $NaAl(C_6H_5)_4$.

The polymer product obtained by the process of this invention is freed of catalyst by first washing it with an organic solvent such as n-hexane. This washing is done before the polymer product has had a chance to come into contact with air or moisture, since the catalysts of this invention readily undergo hydrolysis or oxidation and are rendered insoluble in organic liquids. Following the hexane wash, washing with ether is recommended since ether has been found to have a beneficial effect on removal of color. After the ether has been withdrawn from the polymer, the polymer is treated with boiling water accompanied by agitation. The polymer is then treated with a hot aqueous hydrochloric acid solution in order to remove residual metal salts to a considerable extent.

The following examples are offered as a better understanding of the present invention and are not to be construed as unnecessarily limiting thereto. In the following examples the Ziegler type catalysts employed were prepared by procedures known to those skilled in the art. For example, the diethyl aluminum bromide (boiling point 56° C. at 0.3 mm. mercury pressure) was prepared by the conventional reaction of magnalium alloy (2:1 by weight of aluminum:magnesium) with ethyl bromide in the presence of a catalytic amount of a magnesium Grignard reagent at a temperature of about 50° C.

*Example 1*

After flushing a 10 ml. glass polymerization tube with nitrogen, the tube was evacuated and 0.10 gram of diethyl aluminum bromide was added thereto. The contents of the tube were then frozen at liquid nitrogen temperature followed by the addition thereto of 0.5 gram of titanium tetrachloride. After refreezing the contents of the tube, 5 grams of 2-trifluoromethyl butadiene were then condensed into the tube in the absence of air and moisture. The tube was then sealed and maintained at a temperature of —20° C. for about 48 hours. At the end of this time, the contents of the tube were washed with 100 ml. acetone followed in sequence by 100 ml. of water, 100 ml. of 10 percent HCl and 100 ml. of water. The washed polymer was then vacuum dried at about 50° C. A rubbery polymer, namely, poly-2-trifluoromethyl butadiene homopolymer was obtained in about a 20 percent conversion of total monomer employed to polymer product.

*Example 2*

After flushing a 10 ml. glass polymerization tube with nitrogen, the tube was evacuated and 0.10 gram of diethyl aluminum bromide was added thereto. The contents of the tube were then frozen at liquid nitrogen temperature followed by the addition thereto of 0.05 gram of titanium tetrachloride. After refreezing the contents of the tube, 5 grams of 1,1,3-trifluorobutadiene were then condensed into the tube in the absence of air and moisture. The polymerization reaction occurred very rapidly going to completion in less than two minutes. The product was worked up following the same procedure as described in Example 1 above. Approximately 5 grams of a tough, snappy rubbery homopolymer of 1,1,3-trifluorobutadiene were obtained. The polymer product of this example possesses good low temperature flexibility and is particularly useful in the fabrication of resilient gaskets, pump diaphragms and O-rings.

*Example 3*

The procedure of Example 2 above was repeated except that 5 ml. of hexane were charged to the polymerization tube in addition to the 5 grams of 1,1,3-trifluorobutadiene, 0.6 millimole of diethyl aluminum bromide and 0.2 millimole of titanium tetrachloride. The polymerization was carried out at 25° C. and very rapidly went to completion in less than 2 minutes to yield a rubbery homopolymer of 1,1,3-trifluorobutadiene in quantitative yield.

*Example 4*

After flushing a 10 ml. glass polymerization tube with nitrogen, the tube was evacuated and 0.2 gram of diethyl aluminum bromide was added thereto. The contents of the tube were then frozen at liquid nitrogen temperature followed by the addition thereto of 0.05 gram of titanium tetrachloride. After refreezing the contents of the tube, 5 grams of 1,1,2-trifluorobutadiene were then condensed into the tube in the absence of air moisture. The polymerization reaction occurred very rapidly going to completion in less than two minutes. The product was worked up following the same procedure as described in Example 1 above. Approximately 5 grams of a tough, snappy rubbery homopolymer of 1,1,2-trifluorobutadiene were obtained.

*Example 5*

After flushing a 10 ml. glass polymerization tube with nitrogen, the tube was evacuated and 0.5 gram of diethyl aluminum bromide was added thereto. The contents of the tube were then frozen at liquid nitrogen temperature followed by the addition thereto of 0.2 gram of titanium tetrachloride. After refreezing the contents of the tube, 5 grams of perfluorocyclobutene were then condensed into the tube in the absence of air and moisture. The tube was then sealed and maintained at a temperature of —20° C. for about 24 hours to obtain poly-perfluorocyclobutene homopolymer grease in about a 10 percent conversion of monomer to polymer product.

*Example 6*

After flushing a 10 ml. glass polymerization tube with nitrogen, the tube was evacuated and was charged with 0.14 gram of diethyl aluminum bromide at liquid nitrogen temperature. To the frozen contents of the tube there were then added 5 grams of 1,1,2,-trifluorobutadiene. The tube was then sealed and the polymerization reaction was carried out for a period of 24 hours of an average temperature of about 10° C. A low molecular weight oil representing poly-1,1,2-trifluorobutadiene homopolymer was obtained in about a 50 percent conversion of monomer to polymer product. Similarly, 1,1,2-trifluorobutadiene is polymerized under the same conditions of time and temperature by employing diethyl aluminum chloride as the catalyst in place of the bromide.

*Example 7*

After flushing a 10 ml. glass polymerization tube with nitrogen, 0.1 gram of diethyl aluminum bromide was added thereto. The contents of the tube were then frozen at liquid nitrogen temperature followed by the addition thereto of 0.05 gram of titanium tetrachloride. After refreezing the contents of the tube at liquid nitrogen temperature, a monomer mixture containing 25 mol percent (1.25 grams) of 1,1,3-trifluorobutadiene and 75 mol percent (3.75 grams) of 1,1,2-trifluorobutadiene was condensed into the tube in the absence of air and moisture. The tube was then sealed and the polymerization reaction was carried out at a temperature of —20° C. and was completed in about 5 minutes. The conversion of monomers to polymer product was quantitative, the product being a rubbery copolymer containing about 25 and about 75 mol percent of 1,1,3-trifluorobutadiene and 1,1,2-trifluorobutadiene, respectively.

*Example 8*

After flushing a 10 ml. glass polymerization tube with nitrogen, 0.2 gram of diethyl aluminum bromide was added thereto. The contents of the tube were then frozen at liquid nitrogen temperature followed by the addition thereto of 0.05 gram of titanium tetrachloride. After refreezing the contents of the tube at liquid nitrogen temperature, a monomer mixture containing 75 mol percent (3.75 grams) of 1,1,3-trifluorobutadiene and 25 mol percent (1.25 grams) of 1,1,2-trifluorobutadiene was condensed into the tube in the absence of air and moisture. The tube was then sealed and the polymerization reaction was carried out at a temperature of —20° C. and was completed in about 5 minutes. The conversion of monomers to polymer product was quantitative, the product being a rubbery copolymer containing about 75 and about 25 mol percent of 1,1,3-trifluorobutadiene and 1,1,2-trifluorobutadiene, respectively. The copolymer products of this example and of Example 7 above possess outstanding low temperature properties and resistance to swell by aliphatic and aromatic type oils and fuels. They are moldable by conventional techniques into various articles such as gaskets, pump seals and gloves, boots and the like.

Example 9

After flushing a 300 ml. glass polymerization tube with nitrogen, the tube was evacuated and was charged with 0.7 gram of diethyl aluminum bromide at liquid nitrogen temperature. To the frozen contents of the tube there was then added 0.8 gram of titanium tetrachloride. After refreezing the contents of the tube, 100 grams of trifluorochloroethylene were condensed in the tube in the absence of air and moisture. The tube was then sealed and the polymerization reaction was carried out at 25° C. for a reaction time of 48 hours. The contents of the tube were then washed with 100 ml. n-hexane followed in sequence with washing with 100 ml. boiling water, 200 ml. 10 percent HCl solution and dried overnight at about 150° C. Thermoplastic polytrifluorochloroethylene homopolymer was obtained in about a 20 percent conversion and was found to have a dilute solution viscosity of 0.522 centistoke as determined in a 0.75 percent solution of dichlorobenzotrifluoride at 266° F., and a ZST of 98 seconds.

Example 10

After flushing a 300 ml. glass polymerization tube with nitrogen, the tube was evacuated and was charged with 0.27 gram of triisobutyl aluminum at liquid nitrogen temperature. To the frozen contents of the tube there was then added 0.5 gram of titanium tetrachloride. After refreezing the contents of the tube, 100 grams of trifluorochloroethylene were condensed in the tube in the absence of air and moisture. The tube was then sealed and the polymerization reaction was carried out at 25° C. for a reaction time of 48 hours. The contents of the tube were then washed in sequence with n-hexane, ether, water and 10 percent HCl and dried for 16 hours at 150° C. A satisfactory yield of relatively low molecular weight poly-trifluorochloroethylene homopolymer was obtained as the product of the process.

Example 11

After flushing a 300 ml. glass polymerization tube with nitrogen, the tube was evacuated and was charged with 0.68 gram of diethyl aluminum bromide. The contents of the tube were frozen at liquid nitrogen temperature followed by the addition thereto of 0.28 gram of titanium tetrachloride. After refreezing the contents of the tube, 100 grams of trifluorochloroethylene were condensed into the tube in the absence of air and moisture. The tube was then sealed and was allowed to stand at 25° C. for 5 days to yield a 10 percent conversion of total monomer employed to thermoplastic polytrifluorochloroethylene homopolymer having a ZST of 95 seconds and a dilute solution viscosity of 0.40 centistoke as determined in a 0.75 percent solution of dichlorobenzotrifluoride at 266° F. Trifluorochloroethylene is similarly polymerized under the same reaction conditions by employing a dialkyl aluminum hydride such as diethyl aluminum hydride in place of the diethyl aluminum bromide.

Example 12

The procedure of Example 11 above was repeated except that a trace amount of air was admitted to the tube before the tube was sealed. The polymerization reaction was carried out at 20° C. for 5 hours yielding a 20 percent conversion of monomer employed to thermoplastic polytrifluorochloroethylene homopolymer having a ZST of 198 seconds and a dilute solution viscosity of 0.8 centistoke as determined in a 0.75 percent solution of dichlorobenzotrifluoride at 266° F.

By employing procedures similar to those of the above examples, other fluorine-containing olefins such as vinylidene fluoride, trifluorobromoethylene, tetrafluoroethylene and 2,3,3,3-tetrafluoropropene may be advantageously polymerized to useful polymer products by using dialkyl aluminum halides, aluminum trialkyls, dialkyl aluminum hydrides, or any of the other Ziegler type catalysts mentioned hereinabove.

As is apparent the present invention relates to the use of a Ziegler type catalyst for the polymerization of fluorine-containing olefins such as trifluorochloroethylene and 1,1,3-trifluorobutadiene to produce polymers ranging from normally liquid materials to normally solid higher molecular weight compositions. The Ziegler type catalyst such as diethyl aluminum bromide, for example, is introduced into the reaction zone as a substantially pure compound. The process of this invention may be carried out in a batchwise or continuous manner as may be desired, continuous operation being particularly applicable when polymerizing a fluoro-diene such as 1,1,3-trifluorobutadiene and 1,1,2-trifluorobutadiene and any mixture thereof. Various alterations and modifications of the reactants, reaction conditions and apparatus employed in the presently described process may become apparent to those skilled in the art without departing from the scope of this invention.

I claim:

A novel process which comprises polymerizing only trifluorochloroethylene in admixture with diethyl aluminum bromide and titanium tetrachloride at a temperature between about −40° C. and about 60° C. to produce a polymer of trifluorochloroethylene.

References Cited in the file of this patent

UNITED STATES PATENTS

| | | |
|---|---|---|
| 2,484,530 | Schroeder | Oct. 11, 1949 |
| 2,683,140 | Howard | July 6, 1954 |
| 2,824,089 | Peters et al. | Feb. 18, 1958 |
| 2,827,447 | Nowlin et al. | Mar. 18, 1958 |
| 2,832,759 | Nowlin et al. | Apr. 29, 1958 |
| 2,840,551 | Field et al. | June 24, 1958 |
| 2,842,474 | Pratt | July 8, 1958 |
| 2,871,276 | Eiszner | Jan. 27, 1959 |
| 2,881,156 | Pilar et al. | Apr. 7, 1959 |
| 2,882,264 | Barnes et al. | Apr. 14, 1959 |

FOREIGN PATENTS

| | | |
|---|---|---|
| 533,362 | Belgium | May 16, 1955 |

OTHER REFERENCES

Moeller: "Inorganic Chemistry," page 405 (1952).

UNITED STATES PATENT OFFICE

CERTIFICATE OF CORRECTION

Patent No. 3,089,866            May 14, 1963

George H. Crawford, Jr.

It is hereby certified that error appears in the above numbered patent requiring correction and that the said Letters Patent should read as corrected below.

Column 5, line 26, for "0.5" read -- 0.05 --.

Signed and sealed this 28th day of April 1964.

(SEAL)
Attest:
ERNEST W. SWIDER

Attesting Officer

EDWARD J. BRENNER
Commissioner of Patents